(12) United States Patent
Kim et al.

(10) Patent No.: US 10,635,304 B2
(45) Date of Patent: Apr. 28, 2020

(54) DISPLAY MODE SWITCHING DEVICE AND METHOD FOR MOBILE TERMINAL

(71) Applicant: Samsung Electronics Co., Ltd., Suwon-si, Gyeonggi-do (KR)

(72) Inventors: Byoung Ju Kim, Seoul (KR); Tae Kyung Kim, Seongnam-si (KR); Tae Won Um, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/946,331

(22) Filed: Nov. 19, 2015

(65) Prior Publication Data

US 2016/0077736 A1    Mar. 17, 2016

Related U.S. Application Data

(63) Continuation of application No. 13/734,425, filed on Jan. 4, 2013, now Pat. No. 10,503,397, which is a
(Continued)

(30) Foreign Application Priority Data

May 23, 2008    (KR) .................. 10-2008-0048153

(51) Int. Cl.
*G06F 3/0488*    (2013.01)
*G06F 3/02*    (2006.01)
(Continued)

(52) U.S. Cl.
CPC .......... *G06F 3/04886* (2013.01); *G06F 3/02* (2013.01); *G09G 5/00* (2013.01); *G09G 5/38* (2013.01);
(Continued)

(58) Field of Classification Search
CPC ............. G06F 2200/1614; G06F 3/02; G06F 3/04886; G09G 2340/0492;
(Continued)

(56) References Cited

U.S. PATENT DOCUMENTS 6,307,541 B1 * 10/2001 Ho ........................... B41J 3/01
341/28
6,373,501 B1    4/2002 Fiero
(Continued)

FOREIGN PATENT DOCUMENTS

CN    1573689 A    2/2005
CN    101031119 A    9/2007
(Continued)

OTHER PUBLICATIONS

English Translation of Chinese Office Action dated Nov. 15, 2012 issued for related Chinese Patent Application No. 200980118571.2.
(Continued)

*Primary Examiner* — Jin Cheng Wang
(74) *Attorney, Agent, or Firm* — Jefferson IP Law, LLP (57) ABSTRACT

The present application relates to a display mode switching device and method for a portable electronic device. In particular, the present application relates to a portable electronic device that can switch display modes of an integrated display and input device to facilitate composition of a text message by switching between a portrait mode and a landscape mode. A portable electronic device may use a display mode switching method in which a posture of the portable electronic device can be checked, and a display mode can be selected based on the posture. A portrait-mode text messaging composition window with a portrait-mode key map and a landscape-mode text messaging composition window with a landscape-mode key map can be displayed in the selected display mode.

12 Claims, 9 Drawing Sheets

Related U.S. Application Data continuation of application No. 12/472,085, filed on May 26, 2009, now abandoned.

(51) Int. Cl.
  *G09G 5/38* (2006.01)
  *H04M 1/02* (2006.01)
  *G06F 3/01* (2006.01)
  *G06F 3/048* (2013.01)
  *G09G 5/00* (2006.01)

(52) U.S. Cl.
  CPC ... *H04M 1/0202* (2013.01); *G06F 2200/1614* (2013.01); *G09G 2340/0492* (2013.01); *G09G 2340/145* (2013.01); *H04M 1/0233* (2013.01); *H04M 1/0245* (2013.01); *H04M 2250/12* (2013.01); *H04M 2250/22* (2013.01)

(58) Field of Classification Search
  CPC ...... G09G 2340/145; G09G 5/00; G09G 5/38; H04M 1/0233; H04M 1/0245; H04M 2250/12; H04M 2250/22
  USPC .................................... 345/156, 168, 649
  See application file for complete search history.

(56) References Cited

U.S. PATENT DOCUMENTS

| | | | |
|---|---|---|---|
| 6,986,103 B1 | 1/2006 | Beezer et al. | |
| 7,158,154 B2 | 1/2007 | Kim et al. | |
| 8,830,176 B2* | 9/2014 | Bos | G06F 3/0237 345/157 |
| 2001/0011993 A1 | 8/2001 | Saarinen | |
| 2001/0048378 A1 | 12/2001 | Horie | |
| 2002/0027549 A1* | 3/2002 | Hirshberg | G06F 3/0234 345/168 |
| 2002/0059066 A1* | 5/2002 | O'Hagan | G10L 15/30 704/231 |
| 2003/0095053 A1* | 5/2003 | Kandogan | G06F 3/0233 341/22 |
| 2003/0193480 A1 | 10/2003 | Nuovo et al. | |
| 2004/0095327 A1* | 5/2004 | Lo | G06F 3/0236 345/169 |
| 2005/0073446 A1* | 4/2005 | Lazaridis | G06F 3/0202 341/22 |
| 2005/0090288 A1 | 4/2005 | Stohr et al. | |
| 2005/0143124 A1 | 6/2005 | Kennedy et al. | |
| 2005/0171893 A1 | 8/2005 | Gaer | |
| 2005/0243069 A1* | 11/2005 | Yorio | G06F 1/1616 345/173 |
| 2005/0251752 A1* | 11/2005 | Tan | G06F 3/04886 715/741 |
| 2006/0034042 A1 | 2/2006 | Hisano et al. | |
| 2006/0209020 A1 | 9/2006 | Scheiblhuber | |
| 2006/0270445 A1 | 11/2006 | Miramontes | |
| 2007/0061718 A1* | 3/2007 | Nurmi | G06F 3/0237 715/201 |
| 2007/0061754 A1* | 3/2007 | Ardhanari | G06F 3/04895 715/816 |
| 2007/0085759 A1 | 4/2007 | Lee et al. | |
| 2007/0138290 A1 | 6/2007 | Salvato | |
| 2007/0147933 A1* | 6/2007 | Zhang | G06F 1/1605 400/486 |
| 2008/0055263 A1 | 3/2008 | Lemay et al. | |
| 2008/0122796 A1* | 5/2008 | Jobs | G06F 3/0488 345/173 |
| 2008/0158163 A1 | 7/2008 | Ladouceur et al. | |
| 2008/0165148 A1* | 7/2008 | Williamson | G06F 3/04883 345/173 |
| 2008/0167081 A1* | 7/2008 | Eng | H04M 1/0202 455/566 |
| 2008/0174553 A1* | 7/2008 | Trust | G06F 3/0202 345/163 |
| 2008/0174570 A1* | 7/2008 | Jobs | G06F 3/0488 345/173 |
| 2008/0184360 A1* | 7/2008 | Kornilovsky | G06F 3/0362 726/17 |
| 2008/0204418 A1* | 8/2008 | Cybart | G06F 1/1626 345/173 |
| 2008/0224898 A1* | 9/2008 | Jin | H04M 1/505 341/22 |
| 2008/0268901 A1 | 10/2008 | Miramontes | |
| 2008/0284744 A1 | 11/2008 | Park et al. | |
| 2008/0304892 A1 | 12/2008 | Baker | |
| 2008/0309519 A1* | 12/2008 | Bengtsson | G06F 3/02 341/22 |
| 2009/0015556 A1* | 1/2009 | Kazmi | G06F 3/0238 345/159 |
| 2009/0049411 A1* | 2/2009 | Shim | G06F 3/0482 715/841 |
| 2009/0058823 A1 | 3/2009 | Kocienda | |
| 2009/0088217 A1 | 4/2009 | Chung et al. | |
| 2009/0186659 A1* | 7/2009 | Platzer | G06F 1/1613 455/566 |
| 2009/0195959 A1* | 8/2009 | Ladouceur | G06F 3/0202 361/283.1 |
| 2009/0225035 A1 | 9/2009 | Baik | |
| 2009/0225041 A1* | 9/2009 | Kida | G06F 3/04886 345/173 |
| 2009/0237361 A1* | 9/2009 | Mosby | G06F 3/04883 345/173 |
| 2009/0237364 A1* | 9/2009 | Bloomcamp | G06F 3/016 345/173 |
| 2009/0247112 A1* | 10/2009 | Lundy | G06F 3/0237 455/404.1 |
| 2009/0247230 A1 | 10/2009 | Lundy et al. | |
| 2009/0249240 A1 | 10/2009 | Lundy et al. | |
| 2009/0249252 A1 | 10/2009 | Lundy et al. | |
| 2009/0265669 A1* | 10/2009 | Kida | G06F 3/0234 715/863 |
| 2009/0303187 A1* | 12/2009 | Pallakoff | G06F 3/0488 345/169 |
| 2010/0030549 A1 | 2/2010 | Lee et al. | |
| 2010/0053089 A1* | 3/2010 | Kwok | G06F 3/04886 345/173 |
| 2010/0085313 A1* | 4/2010 | Rider | G06F 3/04886 345/173 |
| 2010/0115402 A1* | 5/2010 | Knaven | G06F 3/0237 715/261 |
| 2010/0201712 A1* | 8/2010 | Grignani | G06F 1/1626 345/660 |
| 2010/0207897 A1 | 8/2010 | Ono | |
| 2010/0220061 A1* | 9/2010 | Bos | G06F 3/0237 345/169 |
| 2010/0302163 A1* | 12/2010 | Ghassabian | G06F 3/0237 345/168 |

FOREIGN PATENT DOCUMENTS

| | | |
|---|---|---|
| EP | 1124175 A2 | 8/2007 |
| JP | 2002-062964 A | 2/2002 |
| KR | 20-0266509 | 2/2002 |
| KR | 10-2007-0041224 A | 4/2007 |
| KR | 10-2007-0058109 A | 6/2007 |
| KR | 10-2007-0099824 A | 10/2007 |
| KR | 10-0764652 B1 | 10/2007 |
| WO | 02-31807 A1 | 4/2002 |
| WO | 20061010225 A1 | 2/2006 |

OTHER PUBLICATIONS

Non-Final Office Action dated Mar. 13, 2013 for related U.S. Appl. No. 12/472,085.
Korean Office Action dated Mar. 9, 2011 in corresponding Korean Patent Application No. 10-2008-0048153.
Extended European Search Report dated May 11, 2011 in European Patent Application No. 09 75 0790.
International Search Report dated Sep. 1, 2009 in International Application No. PCT/KR2009/002750.

(56) References Cited

OTHER PUBLICATIONS

Non-Final Office Action dated Aug. 22, 2011 issued for related U.S. Appl. No. 12/472,085.
Final Office Action dated Jan. 30, 2012 issued for related U.S. Appl. No. 12/472,085.
The State Intellectual Property Office of P.R. China Search Report dated Jun. 4, 2018, Issued in International Application No. 201510651587.7.

* cited by examiner

DISPLAY MODE SWITCHING DEVICE AND METHOD FOR MOBILE TERMINAL

CROSS REFERENCE TO RELATED APPLICATIONS

This is a continuation application of prior U.S. patent application Ser. No. 13/734,425 filed on Jan. 4, 2013, which is a continuation of U.S. patent application Ser. No. 12/472,085 filed May 26, 2009, and which claims the benefit under 35 U.S.C. § 119(a) of a Korean patent application filed on May 23, 2008, in the Korean Intellectual Property Office and assigned Ser. No. 10-2008-0048153, the entire disclosure of each of which is hereby incorporated by reference.

BACKGROUND OF THE INVENTION

Field of the Invention

Embodiments of the present invention relate to a portable electronic device and, in particular, to a display mode switching device and method for a portable electronic device that is capable of switching the display mode between a portrait mode and a landscape mode according to a posture or orientation of the portable electronic device.

Description of the Background

Portable electronic devices have recently become increasingly popular due to their advantage in mobility. Typically, a portable electronic device can have an input device for receiving user input and a display device for displaying the input data. The input device can be in the form of a keypad, a touchpad, a touchscreen, and/or a wheel, and the display device can be, for example, a screen associated with an activated application. The display device may be controlled with a key event or touch event input through the input device.

The input device can have predetermined input mechanisms for manipulating basic and supplemental voice and data communication functions of the portable electronic device. For example, a conventional input device may have a set of key buttons or a keypad such that a sequence of keys may be input by pushing the key buttons.

Conventional input devices can, in general, be manufactured using a hard and nonflexible material in a fixed arrangement. A user may thus face some inconveniences and problems when attempting to use the input device at specific orientations or postures of the portable electronic device. Accordingly, there is a need to develop a user-friendly input device that can be adjusted adaptive to the posture of the portable electronic device.

SUMMARY OF THE INVENTION

Embodiments of the present invention relate to a portable electronic device and, in particular, to a display mode switching device and method for a portable electronic device that is capable of switching the display mode between a portrait mode and a landscape mode according to a posture or orientation of the portable electronic device. The display mode switching device facilitates composition of text and media messages at various orientations of portable electronic device.

Additional features of the embodiments will be set forth in the description which follows, and in part will be apparent from the description, or may be learned by practice of the invention.

In accordance with an exemplary embodiment of the present invention, a display mode switching method of a portable electronic device includes receiving a key input for activating a text message function; checking a posture of the portable electronic device in response to the key input; selecting one of a portrait mode and a landscape mode according to the posture of the portable electronic device; and displaying a first text message composition window having a first key map in the selected display mode.

In accordance with another exemplary embodiment of the present invention, A display mode switching device of a portable electronic device includes an input unit which receives a key input for activating a text message function; a mode condition detector which detects a posture of the portable electronic device in response to the key input; a control unit which selects one of portrait mode and a landscape mode according to the posture of the portable electronic device; and a display unit which displays a first text message composition window having a first key map in the selected display mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Embodiments of the present invention are described more fully hereinafter with reference to the accompanying drawings in which exemplary embodiments of the invention are illustrated. Embodiments of the invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions may be exaggerated for clarity. Detailed descriptions of well-known functions and structures incorporated herein may be omitted to avoid obscuring the subject matter of the embodiments. Like reference numerals in the drawings denote like elements.

It will be understood that when a first element or layer is referred to as being "on," "connected to" or "coupled to" another element(s) or layer(s), the first element or layer can be directly on, connected to, or coupled to the other element or layer(s) and/or intervening elements or layers may be present. In contrast, when an element is referred to as being "directly on," "directly connected to" or "directly coupled to" another element or layer, there may be no intervening elements or layers present. As used herein, the term "and/or" includes any and all combinations of one or more of the associated listed items.

It will be understood that although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments and is not intended to be limiting of the present invention. As used herein, the singular forms "a," "an" and "the" can include the plural forms as well, unless the context clearly indicates otherwise. It will be further understood that the terms "comprises" and/or "comprising," when used in this specification, can specify the presence of stated features, integers, steps, operations, elements, and/or components, but do not necessarily preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result of, for example, manufacturing techniques and/or tolerances, are to be expected. Thus, example embodiments of the present invention should not be construed as limited to the particular shapes of regions illustrated herein but can include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, a "portrait mode" is a display mode in which the portable electronic device can be postured such that the short axis of a rectangular display screen is horizontal to the ground and the long axis of the display screen is vertical relative to the ground. In the portrait mode, the characters of a text message can be arranged from left to right along the short axis.

In the following description, a "landscape mode" is a display mode in which the portable electronic device can be postured such that the short axis of the rectangular display screen is vertical to the ground and the long axis of the rectangular display screen is horizontal relative to the ground. In the landscape mode, the characters of a text message can be arranged from left to right along the long axis.

In the following description, a "3×4 key map" is a map for presenting 12 keys corresponding to 3×4 key buttons on the screen, and a Qwerty key map or 5×4 key map is a map for presenting 5×4 key buttons on the screen. The number of key buttons of each key map is not limited thereto but can be modified.

Hereinafter, embodiments of the present invention will be explained in detail with reference to the accompanying drawings.

Figure 1:
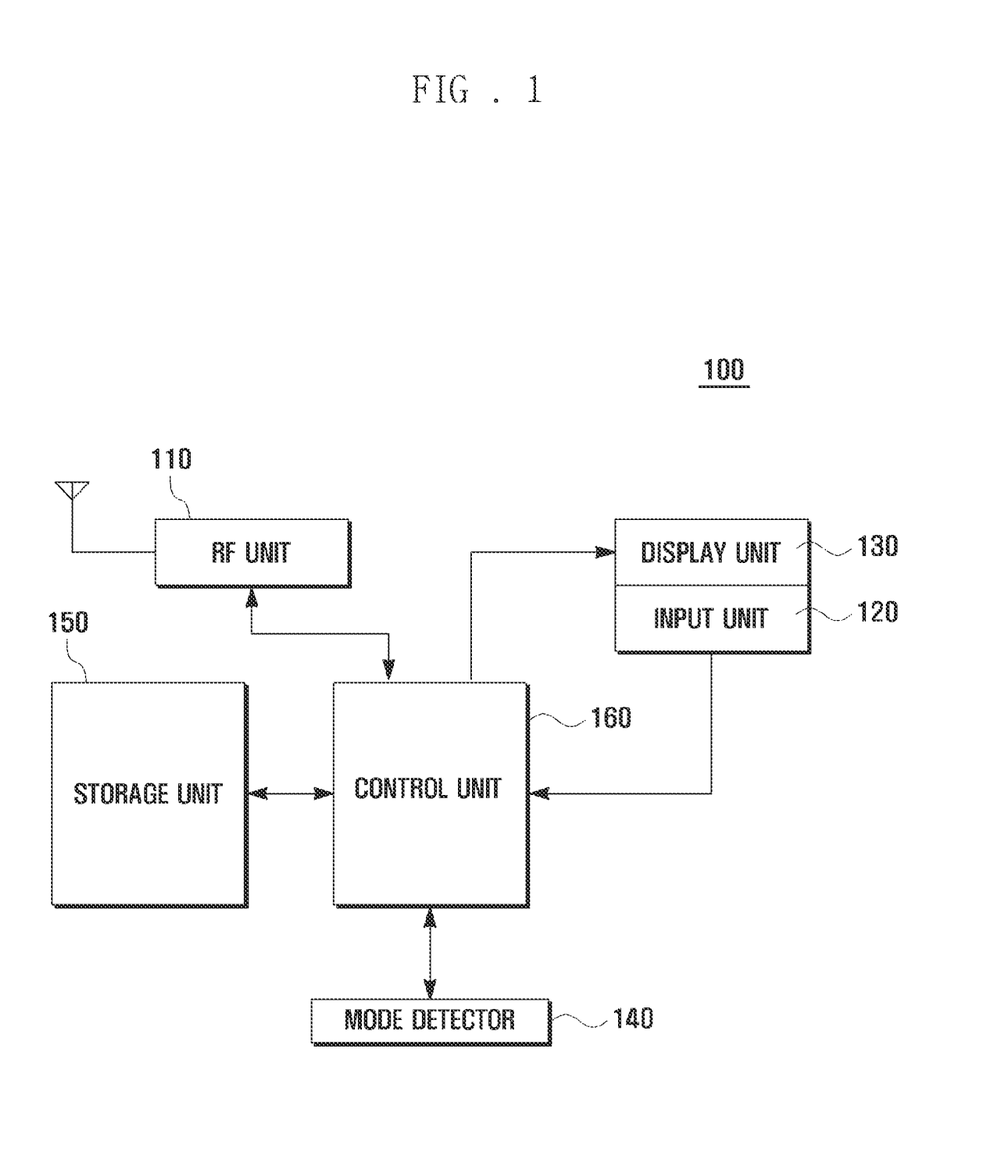
FIG. 1 is a block diagram illustrating a portable electronic device configuration according to embodiments of the present invention.

FIG. 1 is a block diagram illustrating a portable electronic device configuration according to embodiments of the present invention.

Referring to FIG. 1, the portable electronic device 100 includes a Radio Frequency (RF) unit 110, an input unit 120, a display unit 130, a mode condition detector 140, a storage unit 150, and a control unit 160. The input unit 120 may be, for example, a virtual keypad presented on a touchscreen of the portable electronic device 100. Portable electronic device 100 can also be configured with other internal elements. For example, the portable electronic device 100 may further include at least one of an audio processing function, a camera, an MP3 module, a broadcast reception module, and a Global Positioning System (GPS) module.

The mode condition detector 140 can detect conditions outside the portable electronic device 100 and can transfer the detected conditions to the control unit 160 such that the control unit 160 analyses the conditions outside the portable electronic device 100 based on the detected conditions. The control unit 160 can monitor running functions and conditions outside of the portable electronic device 100. The outside conditions can include for example a position, location, or posture of the portable electronic device 100. The control unit 100 can switch the display mode of the display unit 130 in response to a change in the outside conditions. When the display mode changes, the control unit 160 changes a configuration of the input device in correspondence with the change of the display mode so a user of portable electronic device 100 may input data conveniently.

The RF unit 110 may be responsible for establishing wireless channels with base stations for voice and data communication. The RF unit 110 may, for example, establish voice and video communication channels with a radio access network. The RF unit 110 can be controlled by control unit 160. The RF unit 110 may include an RF transmitter for up-converting and amplifying a transmission signal frequency and an RF receiver for low noise amplification and down-converting a received signal frequency. In some embodiments, the RF unit 110 may transmit a text message input in the portable electronic device 100 to the radio access network.

The input unit 120 can have a plurality of alphanumeric keys for inputting alphanumeric data and function keys to set and execute various functions of portable electronic device 100. The function keys can be implemented in the form of navigation keys, side keys, and shortcut keys. Input unit 120 can generate a key sequence input corresponding to a user configuration and/or execution of a function of the portable electronic device and can transfer the key sequence to the control unit 160. In some embodiments, the input unit 120 can generate an input signal corresponding to a touch event detected at the display unit 130 and can send the input signal to control unit 160. The input unit 120 can have a key map that can be displayed on the screen. The key map may change in shape in accordance with the change of the display mode. For example, the key map may be arranged at the bottom of the screen in parallel with a short axis of the screen in the portrait mode and a long axis of the screen in the landscape mode. Here, the key map of the input unit 120 can be displayed in the form of a 3×4 keypad in portrait mode and a QWERTY keyboard or a 5×4 keypad in landscape mode.

The display unit 130 can display various display elements including, but not limited to, menus of the portable electronic device 100, user input data, and/or operation status of the portable electronic device 100. For example, the display unit 130 may display an idle mode screen, a menu screen, a text message composition screen, and a communication progress screen.

In some embodiments, the display unit 130 may include a region corresponding to a part of the input unit 120. That is, the display unit 130 may be implemented with a touchscreen or a touchpad such that, when a touch event occurs on the touchscreen or touchpad, the display unit 130 can convert the touch event to an input signal and can transfer the input signal to the control unit 160. When the control unit 160 generates a display mode switching signal based on the signal from the mode condition detector 140, the display unit 130 may switch the display mode based on the display mode switching signal. For example, if a display mode switching signal is received from the control unit 160 while operating in the portrait mode, the display unit 130 may switch the display mode from the portrait mode to the landscape mode. In such cases, the display unit 130 can switch the position and arrangement of the key map present on the screen of the portable electronic device 100. The display unit 130 can be configured such that the key map is placed at the bottom of the screen in both the portrait and landscape modes so the user may input data conveniently. The display unit 130 can be configured such that the key map is arranged in a variety of manners, for example, at both sides of the screen in the landscape mode. Structures of the input unit 120 and display unit 130 are described in more detail with reference to additional drawings.

The mode condition detector 140 can detect a condition associated with the currently running function (e.g., text messaging function) of the portable electronic device 100. The mode condition detector 140 can detect and analyze the current condition or outside conditions of portable electronic device 100 and can transfer the analysis result to control unit 160.

The mode condition detector 140 can be implemented in the form of a sensor or a switch for detecting the current condition of the portable electronic device 100. For example, the mode condition detector 140 can be implemented as a geomagnetic sensor, a pressure sensor, or a switch. If, for example, the mode condition detector 140 is a geomagnetic sensor, detection of a current condition of the portable electronic device 100 may be based on a measurement of the geomagnetic sensor. The mode condition detector 140 may subsequently transfer the detected condition to the control unit 160.

In some embodiments in which the mode condition detector 140 is, for example, a pressure sensor, the mode condition detector 140 may sense the change of pressure caused by user handling of the portable electronic device 100. Subsequently, the mode condition detector 140 may transfer a signal corresponding to the pressure change to the control unit 160. For example, in the portrait mode, pressure sensor-type mode condition detectors may be placed at left and/or right sides of the portable electronic device 100 to detect pressure changes of a left hand grasp and/or a right hand grasp of the user. Pressure sensors may also be arranged at both sides of the portable electronic device 100 in the landscape mode to detect pressure changes of the left hand grasp and/or the right hand grasp. Pressure sensors may be arranged on the side walls of the portable electronic device 100 to minimize or eliminate any interfere with the key map presented on the screen.

In some embodiments in which the mode condition detector 140 is, for example, a switch, the mode condition detector 140 can detect a mechanical motion (e.g. rotation, vertical sliding, and horizontal sliding) of the portable electronic device 100 and transfer a corresponding signal to the control unit 160. A switch-based motion condition detector can be implemented as a switch or a combination of a switch and a sensor. They may/can detect any motion of the portable electronic device 100. For example, the sensor may detect rotation and vertical and/or horizontal sliding motions of a front body of the portable electronic device 100 relative to a rear body of the portable electronic device 100.

It should be understood that the geomagnetic sensor, pressure sensor, and switch described herein are exemplary embodiments of the mode condition detector, and that embodiments of the present invention are not limited thereto. For example, the mode condition detector 140 may also be implemented with an illumination sensor, a temperature sensor, or a window variation sensor. In general, any suitable motion detector may be used as the mode condition detector 140.

Referring back to FIG. 1, the storage unit 150 can store application programs supporting operations (e.g., a text messaging service program and a mode detection detector execution program) of the portable electronic device 100. The storage unit 150 can be used as a buffer for buffering a text message to be transmitted and/or received.

The storage unit 150 can also include a program region and a data region. The program region can store an Operating System (OS) for operating the portable electronic device 100, a messaging service program for sending text and/or multimedia messages from one portable electronic device to another portable electronic device, and a mode condition detector management program for managing the mode condition detector 140 described above. The program region can also store application programs associated with supplementary functions such as camera function, audio playback function, and still and motion picture playback function. In some embodiments, the program region can store a 3×4 key map, qwerty key map, and/or a 5×4 key map. Each key map defines positions of the virtual keypad or keyboard and virtual key buttons corresponding to the virtual keypad on the screen of display unit 130. Accordingly when a touch event occurs on a virtual key button, the display unit 130 can transfer the key sequence corresponding to the alphanumeric or special key linked to the virtual key.

The data region can store application data generated while the application programs are executed in portable electronic device 100. The data region can also store parameters associated with functions of portable electronic device 100 and data input by the user. For example, the data stored in the data region can include video data, phonebook data, audio data, metadata, and other multimedia contents. According to some embodiments, the data region may store text messages sent and/or received by the portable electronic device 100 or composed by the user of the portable electronic device 100.

The storage unit may, in some cases, be packaged in the portable electronic device 100 and/or, in some cases, be connected externally to the portable electronic device 100. The storage unit may be implemented as a memory card, a flash memory device or, in general, any suitable integrated chip.

The control unit 160 can control communication between the various components of portable electronic device 100 discussed above. The control unit can send and receive control signals for executing operations of the portable electronic device. For example, the control unit 160 can detect activation of the text messaging function. When the text messaging function is activated, the control unit 160 can check the current display mode of the portable electronic device and can determine if the display unit 130 is operating in the portrait mode or the landscape mode. In the portrait mode, the control unit 160 can command the display unit 130 to display a predetermined key map (i.e., a 3×4 key map) at a predetermined position on the screen. In the landscape mode, the control unit 160 can command the display unit 130 to display another predetermined key map (i.e., a qwerty key map or a 5×4 key map) at another predetermined position on the screen.

The control unit 160 can direct the mode condition detector 140 to monitor and/or detect variation in the operation environment or outside conditions of the portable electronic device 100. If the mode condition detector 140 detects variation of the operation environment (e.g., the rotation of the portable electronic device), the control unit 160 can switch the display mode from portrait mode to landscape mode or vice versa. The control unit 160 can also resize a text messaging window to fit the switched display mode. Structures of the control unit 160 and the storage unit 150 are described hereinafter in more detail with reference to FIG. 2.

Figure 2:
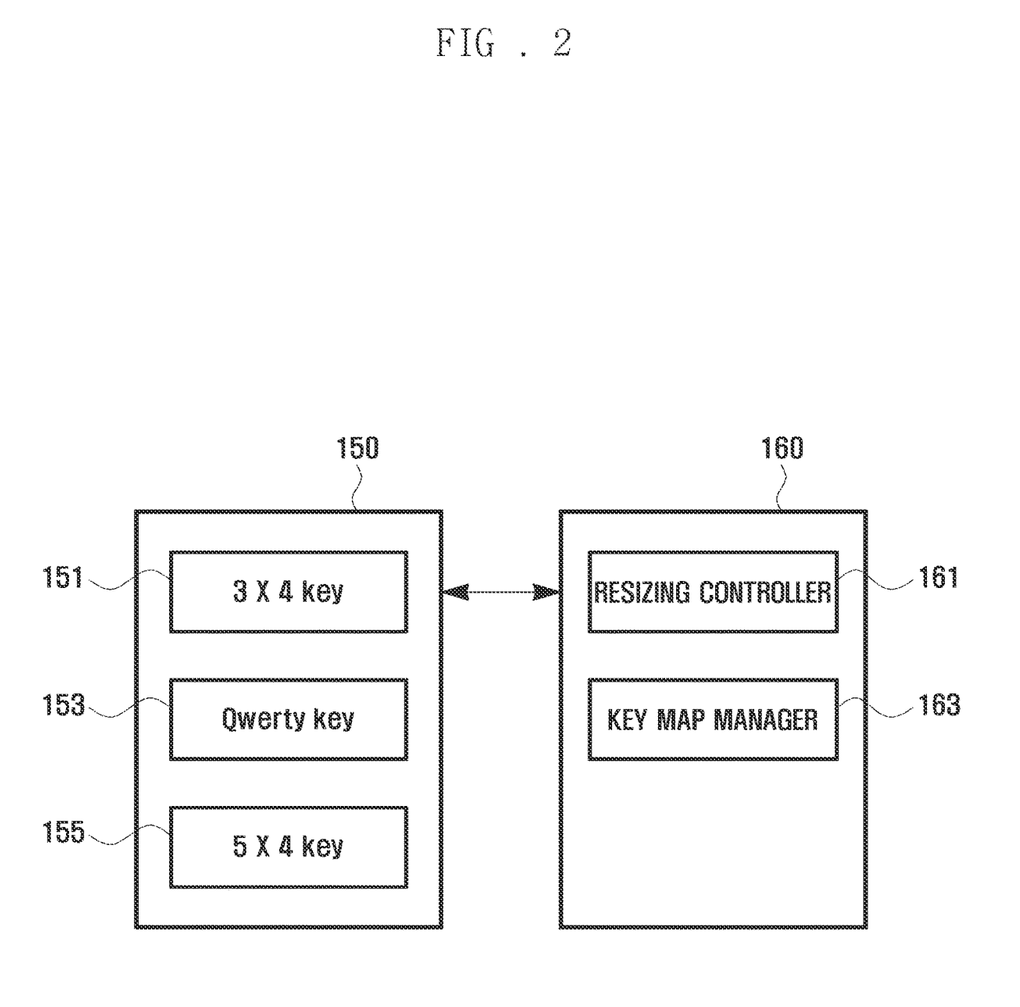
FIG. 2 is a block diagram of the control unit and the storage unit illustrated in FIG. 1 according to embodiments of the present invention.

FIG. 2 is a block diagram of the control unit 160 and the storage unit 150 illustrated in FIG. 1.

Referring to FIG. 2, the control unit 160 can include a resizing controller 161 and/or a key map manager 163. The storage unit 150 can include a 3×4 key map 151, a qwerty key map 153, and/or a 5×4 key map 155.

The resizing controller 161 can resize the display screen of the display unit 130 according to the display mode and mode condition detector 140 of the portable electronic device 100. The resizing controller 161 can receive information on the current display mode of the portable electronic device 100 from the mode condition detector 140 and can adjust the display screen accordingly. For example, when the default display of the portable electronic device changes from the portrait mode to the landscape mode, display unit 130 can be reconfigured to present the resized display screen in the landscape mode. Similarly, when, for example, the default display of the portable electronic device changes from the landscape mode to the portrait mode, the display unit 130 can be reconfigured to present the resized display screen in the portrait mode.

The resizing controller 161 can also resize the characters presented in the text messaging window. For example, when the portable electronic device 100 operates in the portrait mode and the text messaging function is activated, a text message can be presented, by the resizing controller 161, at a predetermined character size. When, for example, the portable electronic device operates in the landscape mode and the text messaging function is activated, a text message can be presented, by the resizing controller 161, at another predetermined character size. If, while entering a message, portable electronic device 100 changes from the portrait mode to the landscape mode, the resizing controller 161 can change the character size predetermined for the portrait mode to the character size predetermined for the landscape mode. Similarly, if a posture of portable electronic device 100 changes from the landscape mode to the portrait mode, the resizing controller 161 can change the character size predetermined for the landscape mode to the character size predetermined for the portrait mode.

The resizing controller 161 may also adjust a length of a character string per line and a number of lines per screen. For example, in the portrait mode, a phrase "Good morning, it's nice to meet you" may be presented on separate contiguous lines (i.e., a first line of the screen displaying "Good morning," and a second line of the screen displaying "it's nice to meet you") with a character size of, for example, 9. The resizing controller 161 can, in the landscape mode, present the phrase "Good morning, it's nice to meet you" in a single line (i.e., a single line of the screen displaying "Good morning, it's nice to meet you" with a character size of, for example, 11. That is, the resizing controller 161 can adjust the character size and positioning of line breaks according to a display mode of portable electronic device 100. In general, character sizes are not limited to 9 or 11 for the portrait or landscape mode, respectively, and may be any size. Generally, the character size in the portrait mode is smaller than the character size in the landscape mode, but it can be any combinations.

The key map manager 163 can load a key map stored in storage unit 12 according to the current display mode. The key map manager 163 can receive, from the mode condition detector 140, a mode status signal providing information on the current display mode. The 3×4 key map 151 may be predetermined for the portrait mode and the qwerty key map 153 or the 5×4 key map 155 may be predetermined for the landscape mode. When the portable electronic device 100 operates in the portrait mode, the key map manager 163 can load the 3×4 key map 151 such that the 3×4 key map can be displayed on the display screen. When the mobile operates in the landscape mode, the key map manager 163 can load the qwerty key map 153 or the 5×4 key map 155 such that the virtual qwerty keypad or 5×4 key map can be displayed on the display screen.

The key map manager 163 can also change a property of a specific key map (e.g., the size of the key map). For example, if the portable electronic device 100 is configured to display the 3×4 key map in both the portrait and landscape modes, the key map manager 163 can communicate with the resizing controller 161 to resize the 3×4 key map in switching between the portrait and landscape modes. In another example, if the display mode of portable electronic device 100 changes from the portrait mode to the landscape mode, the key manager 163 can direct the resizing controller 161 to resize the 3×4 key map together with the key buttons constituting the 3×4 key map in a predetermined manner.

Figure 3A:
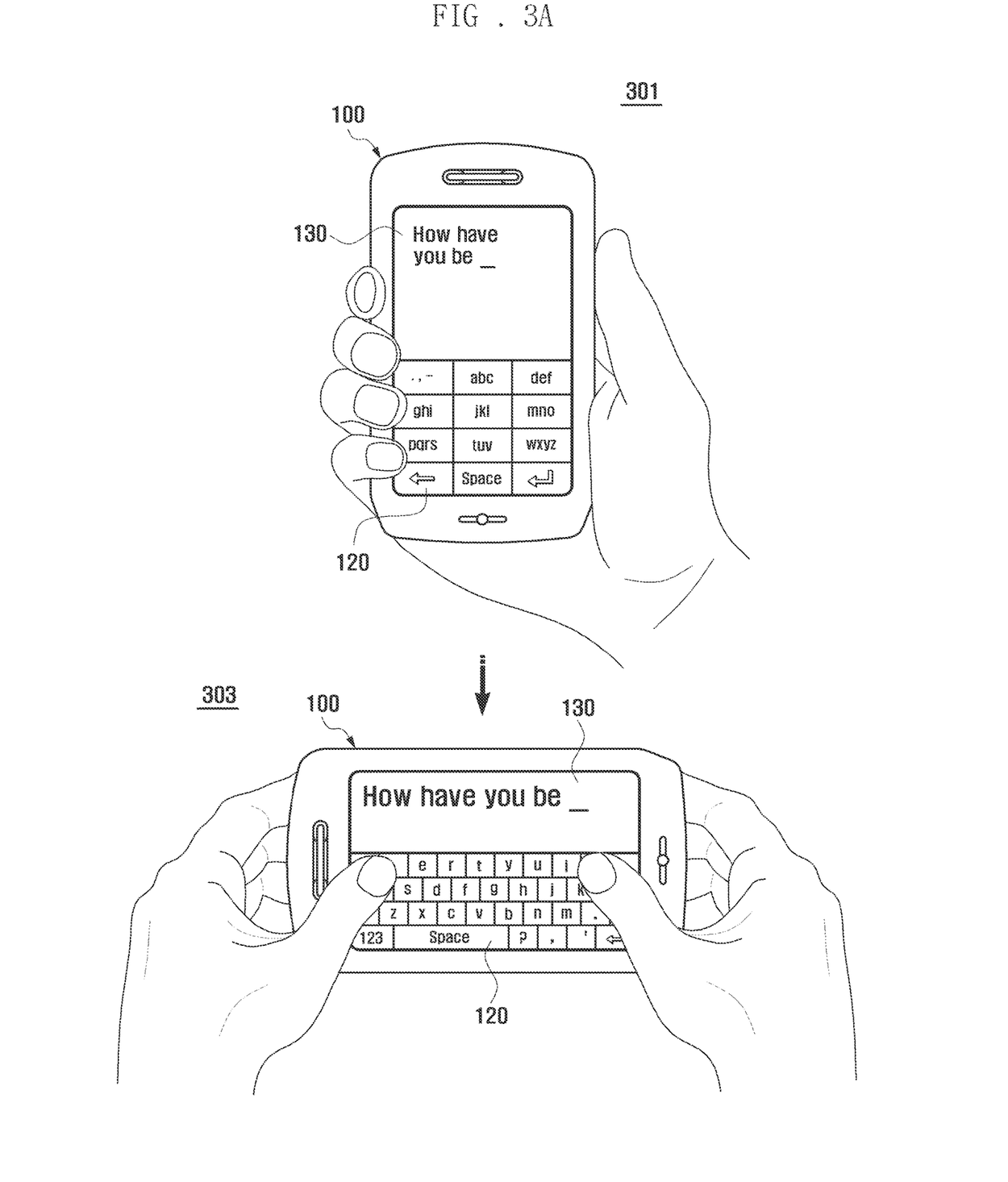
FIGS. 3A to 3C are diagrams illustrating exemplary display mode switching operations of a portable electronic device according to embodiments of the present invention.
Figure 3B:
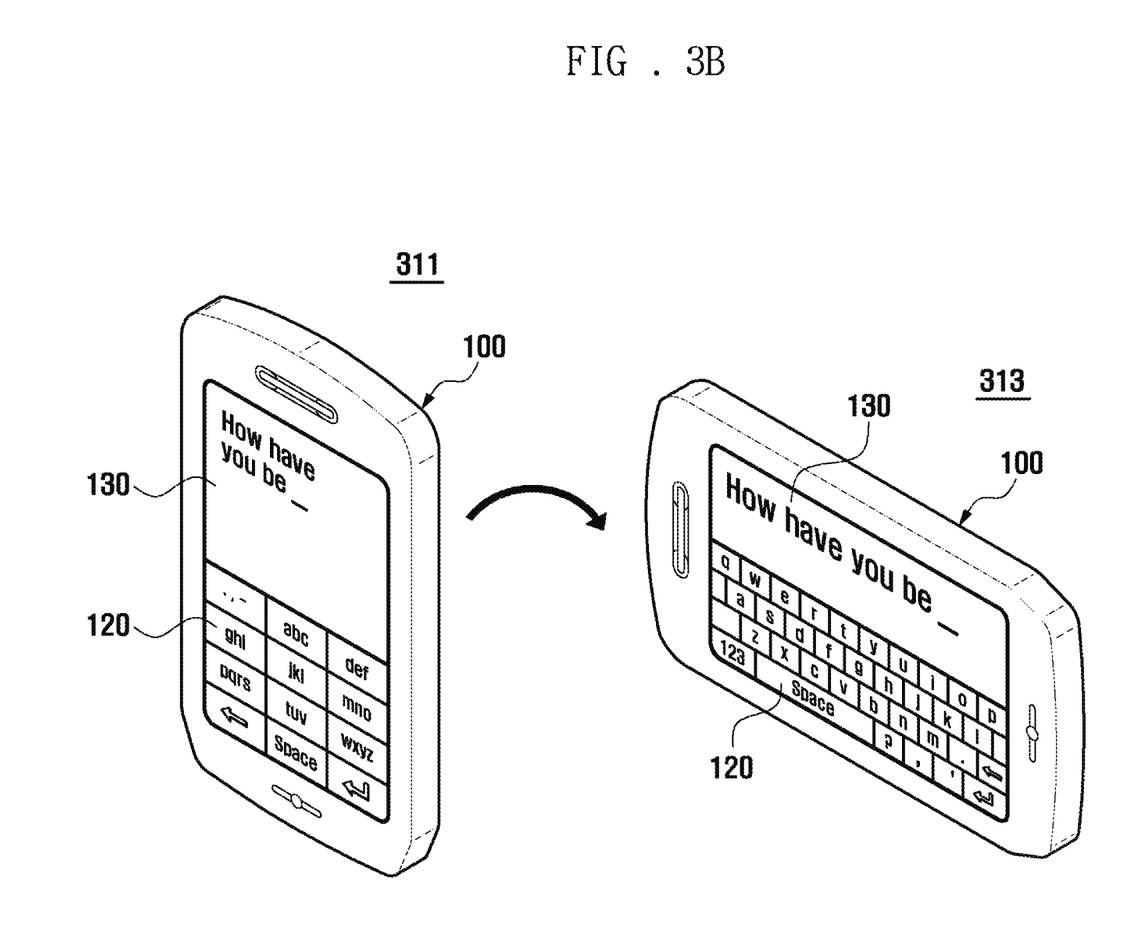
Figure 3C:
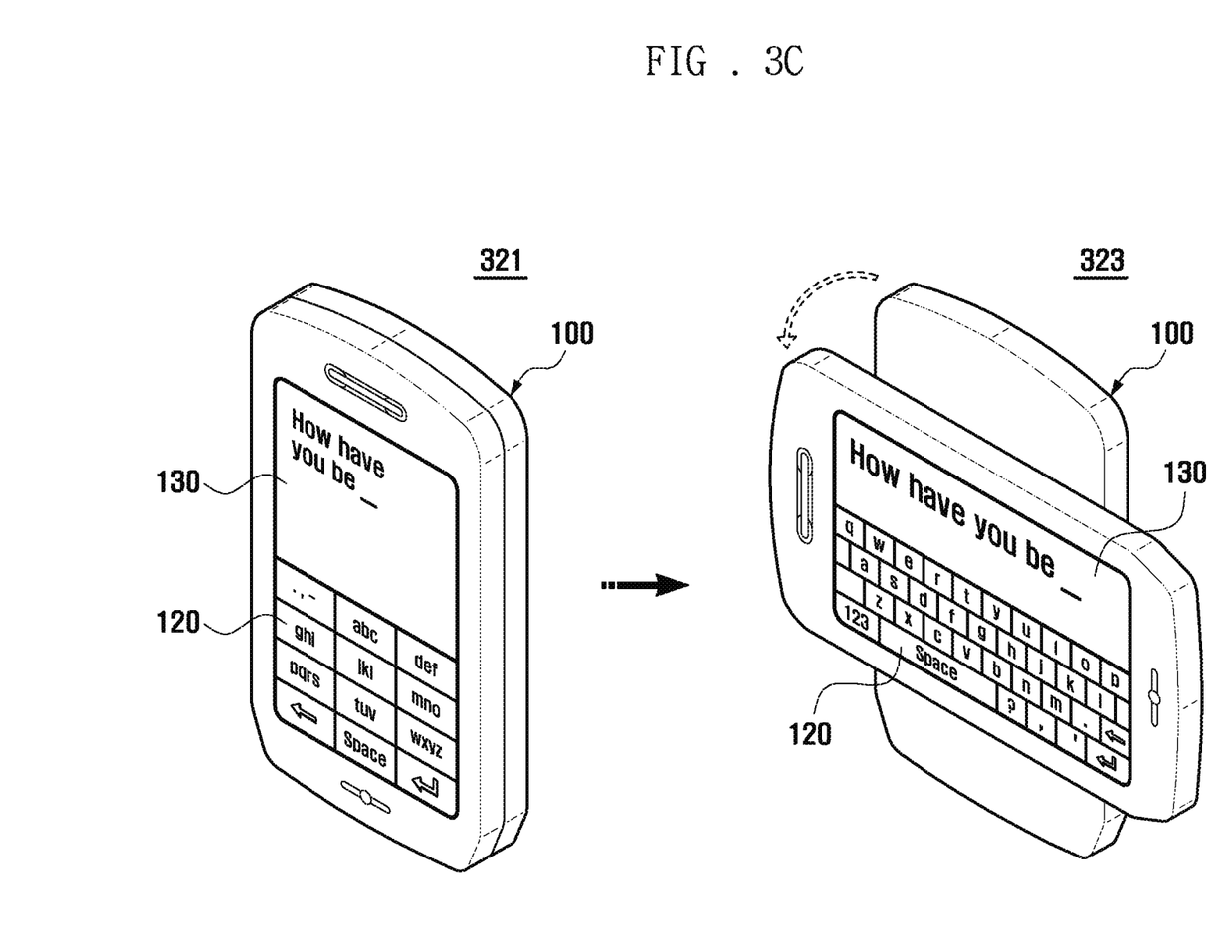

FIGS. 3A to 3C are diagrams illustrating exemplary display mode switching operations of portable electronic device 100.

FIG. 3A illustrates a portable electronic device 100 with a pressure sensor-based mode condition detector 140. Mode condition detectors can be situated along the left and right sides and/or the top and bottom sides of the portable electronic device 100. That is, mode condition detectors may be installed within all or at least one of the side walls of the portable electronic device. In general, mode condition detectors may be placed at any location in the portable electronic device 100. Accordingly, when a user holds the portable electronic device 100, for example, by hand, mode condition detectors can detect the possession and type of grip (e.g., by hand) based on the pressure sensed by the pressure sensor. The mode condition controllers subsequently transfer a holding position signal to the control unit 160.

When portable electronic device 100 is held around its side walls (i.e., portrait posture 301) while operating in the text messaging function as shown in FIG. 3A, the mode condition detector 140 can output a portrait mode driving signal to the control unit 160. Upon receiving the portrait mode driving signal, the control unit 160 can output a control signal to the resizing controller 161 which can resize the visual image to be displayed on the screen of the display unit 130 in the portrait mode. The control unit 160 can also direct key map manager 163 to display a key map onto the screen of the display unit 130. That is, the control unit 160 may direct key map manager 163 to load a key map (e.g., the 3×4 key map) predetermined for the portrait mode such that the 3×4 key map is displayed on the display screen.

When portable electronic device 100 is held at least one of both top and bottom end portions of the portable electronic device 100 (i.e., landscape posture 303) while operating in the text messaging function as shown in FIG. 3A, the mode condition detector 140 can output a landscape mode driving signal to the control unit 160. Upon receiving the landscape mode driving signal, the control unit 160 can output a control signal to the resizing controller 161 which can adjust the visual image to be displayed on the screen of the display unit 130 in the landscape mode. The control unit 160 may direct key map manager 163 to load a key map (e.g., the qwerty key map or the 5×4 key map) predetermined for the landscape mode such that the qwerty key map or the 5×4 key map is displayed on the display screen.

When portable electronic device 100 changes in posture from a portrait mode 301 to landscape posture 303, the portable electronic device 100 can output the landscape mode driving signal to the control unit 160. Upon receipt of the landscape mode driving signal, the control unit 160 can unload the key map predetermined for the portrait mode and can load the key map predetermined for the landscape mode such that the portrait mode screen having the 3×4 key map is changed into the landscape mode screen having the qwerty key map or the 5×4 key map. Here, the left and right sides of the portable electronic device 100 in landscape mode correspond to the top and bottom sides of the portable electronic device 100 in portrait mode.

FIG. 3B, illustrates a portable electronic device 100 configured with geomagnetic sensor-based mode condition detector(s) 140. Mode condition detectors can be situated at a side of or integrated within the portable electronic device 100. In general, mode condition detectors may be placed at any location in the portable electronic device 100. When an application program for providing a text messaging service is activated, mode condition detector 140 can sense a geomagnetic value and can send the geomagnetic value to the control unit 160. The control unit 100 can determine the physical orientation of the portable electronic device based on the geomagnetic value. That is, the control unit 160 can determine the posture of the portable electronic device 100 based on the geomagnetic value sensed by the geomagnetic sensor of the mode condition detector 140.

When the portable electronic device 100 is in the portrait posture 311, as illustrated in FIG. 3B, the control unit 160 can direct the display unit to display the text messaging window with key map 120 in the portrait mode. For example, when portable electronic device 100 operates in the portrait mode, the control unit 160 may direct the display unit to display a 3×4 key map as the input unit 120 at a lower part of the text messaging window.

When the portable electronic device 100 changes in orientation from the portrait posture 311 to the landscape posture 313, the mode condition detector 140 can detect the posture change and can output a control signal to the control unit 160. Upon receipt of the control signal, the control unit 160 can direct the display unit 130 to display the text messaging window in the landscape mode. That is, the control unit 160 may direct the resizing controller 161 to resize the text messaging window and to display the resized text messaging window on the screen of the display unit 130 in landscape mode. The control unit 160 may also direct the key map manager 163 to switch from the 3×4 key map predetermined for the portrait mode to the qwerty key map or the 5×4 key map predetermined for the landscape mode.

FIG. 3C illustrates a portable electronic device 100 configured with a switch-based mode condition detector 140. The portable electronic device 100 in FIG. 3C may have a first body and a second body connected to the first body. The first body can be configured to rotate or slide in longitudinal or lateral direction relative to the second body as shown in FIG. 3C. The mode condition detector 140 can be a switch itself or a sensor for sensing movement of the first body relative to the second body. That is, the mode condition detector 140 may sense a rotation or sliding movement of the first body relative to the second body and may subsequently output a sensing value to control unit 160.

For example, when the first body is oriented in parallel with the second body without rotation 321, the control unit 160 can determine that the portable electronic device 100 is in the portrait posture and can direct the screen of the display unit 130 to display a text messaging window having a 3×4 key map representing the input unit 120. If the first body rotates relative to the second body 323, as illustrated in FIG. 3C, the mode condition detector 140 can transfer a sensing value to the control unit 160. After receiving the sensing value, the control unit may then direct the screen of the display unit 130 to display a text messaging window in the landscape mode (see 323 in FIG. 3C). In some cases, the control unit 160 may direct the resizing controller 161 to adjust the aspect ratio of the text messaging window and may direct the key map manager 163 to display the text messaging window with a key map (e.g., virtual qwerty keypad or virtual 5×4 keypad) predetermined for the landscape mode.

By switching between two display modes according to the posture of the portable electronic device 100, a user may comfortably view and use portable electronic device 100 regardless of the posture of the portable electronic device. A display mode switching method for the above structured portable electronic device is described hereinafter in detail.

Figure 4:
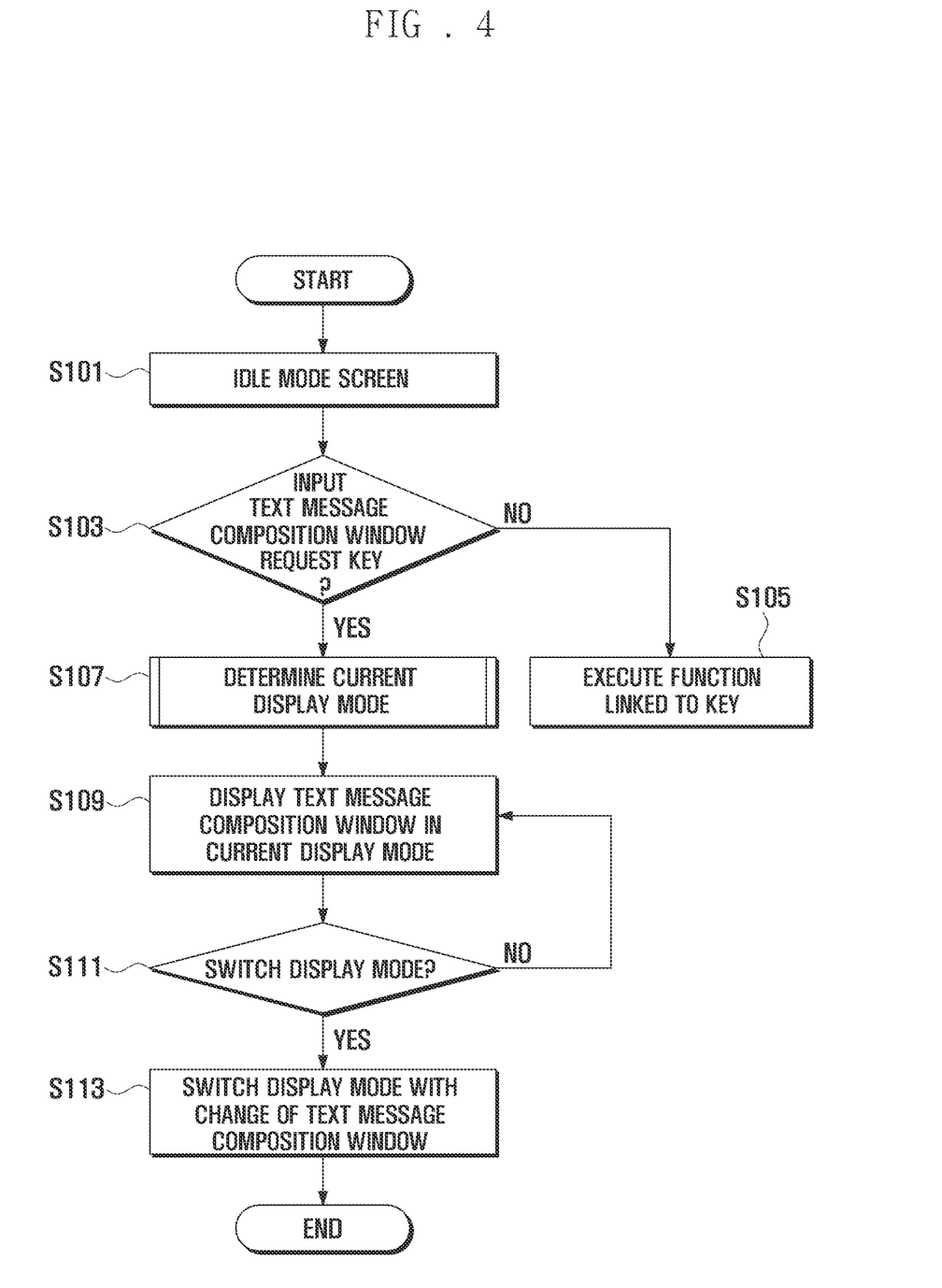
FIG. 4 is a flowchart illustrating a display mode switching method according to embodiments of the present invention.

FIG. 4 is a flowchart illustrating a display mode switching method according to exemplary embodiments of the present invention.

Referring to FIG. 4, a portable electronic device 100 may initially display an idle screen (S101). That is, when portable electronic device 100 is powered on, the control unit 160 can run the operating system (OS) of the portable electronic device 100 to initialize the portable electronic device 100. After completing the initialization, the control unit 160 can set the display unit 130 to display a predetermined idle mode screen. The idle mode screen may display a touch input means representing the input unit 120. The touch input means may be a key map (e.g., 3×4 virtual keypad) corresponding to a physical keypad of the portable electronic device 100. A physical keypad may also be provided at any suitable location on the portable electronic device 100.

While the portable electronic device 100 is operating in idle mode, the control unit 160 may monitor inputs to the portable electronic device to detect a key input. In some cases, a key can be input using the key map presented on the display screen or, in some cases, using the key map presented on the physical keypad or key buttons provided on the casing of the portable electronic device 100. If a key is input, the control unit 160 can determine if the key input is a text message composition window request key (S103).

The text message composition window can be called through a series of menu selection steps or using a hot key linked to calling the text message composition window. In some cases, the text message composition window request key can be selected or input when the hot key linked to the text message composition window presentation event is selected.

Referring back to FIG. 4, if the key input at step S103 is not the text message composition window request key, the control unit 160 can execute a function linked to the key input and can display a menu screen associated with the executed function (S105). The function linked to the key can, in general, be any function apart from a text message composition request function including, for example, a communication function, a file playback function, or a camera function.

If the key input at step S103 is the text message composition window request key, the control unit 160 can determine a current display mode of the portable electronic device 100 (S107). That is, the control unit 160 can check a posture/orientation of the portable electronic device 100. Using information and communication from the mode condition detector 140 as described above, the control unit 160 can determine the current display mode. The display mode determination step is described in more detail with reference to FIGS. 5 to 7.

After determining the current display mode based on the measurement value received from the mode condition detector 140, the control unit 160 can set the display screen to the current display mode (S109). For example, when the current display mode is the portrait mode, a message composition window can be displayed and optimized for the portrait mode together with a key map predetermined for the portrait mode message composition window. The portrait mode message composition window can be configured, for example, with a character size of 9 and a large number of line breaks for limiting the number of characters per line relative to the landscape mode message composition window. The portrait mode message composition window can be displayed with a 3×4 key map sized.

If the current display mode is the landscape mode, a message composition window can be displayed and optimized for the landscape mode together with a key map predetermined for the landscape mode message composition window. The landscape mode message composition window can be configured, for example, with a character size of 11 and a small number of line breaks for limiting the number of characters per line relative to the portrait mode message composition window. The landscape mode message composition window can be displayed with a qwerty key map or a 5×4 key map sized.

When the message composition window in the determined display mode is being displayed, the control unit 160 may detect a mode switching event (S111). That is, the control unit 160 may determine based on the measurement value received from the mode condition detector 140 if the orientation of the portable electronic device 100 has changed. If no mode switching event is detected, (i.e., a measurement value indicating change of the orientation of the portable electronic device is not received from the mode condition detector 140, or no mode switching request key is input by the user), the control unit 160 can maintain the current display mode.

If a mode switching event is detected (i.e., a measurement value indicating change of the orientation of the portable electronic device, or a mode switching request key is input by the user), the control unit 160 can switch display modes (S113). For example, if the mode switching event occurs while the portable electronic device operates in the portrait mode, the control unit 160 can substitute the portrait mode message composition window having the 3×4 key map with the landscape mode message composition window having the qwerty key map or the 5×4 key map. In contrast, if the mode switching event occurs while the portable electronic device operates in the landscape mode, the control unit 160 can substitute the landscape mode message composition window having the qwerty key map or the 5×4 key map with the portrait mode message composition window having the 3×4 key map.

Figure 5:
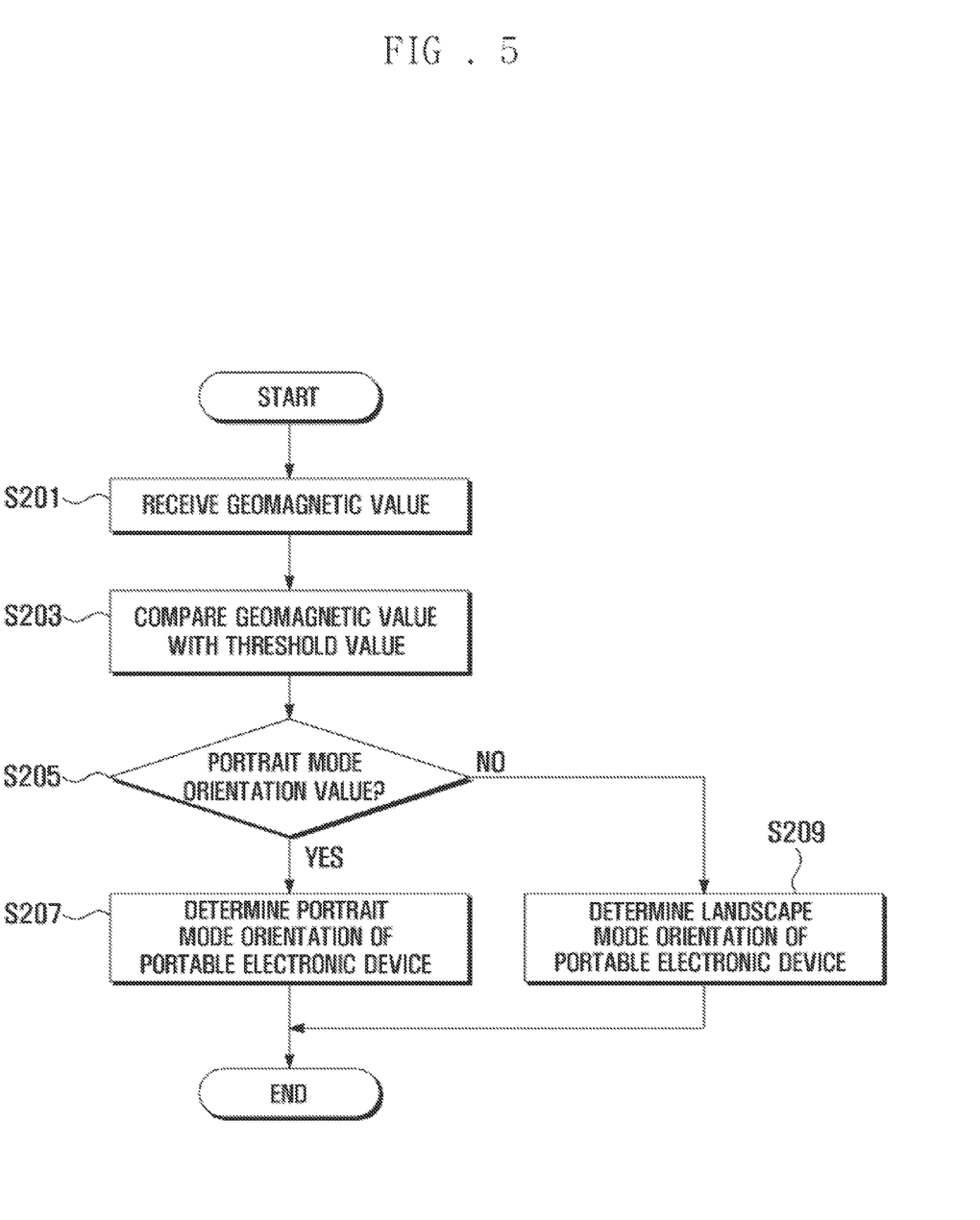
FIG. 5 is a flowchart illustrating a mode determination procedure of the display mode switching method of FIG. 4 according to embodiments of the present invention.

FIG. 5 is a flowchart illustrating a mode determination procedure for the display mode switching method discussed in FIG. 4 according to exemplary embodiments of the present invention.

FIG. 5 is related to exemplary embodiments in which a geomagnetic sensor is used as the mode condition detector 140. Control unit 160 of portable electronic device 100 may receive a geomagnetic value sensed by the mode condition detector 140 (S201). The control unit 160 can compare the sensed geomagnetic value with a threshold value (S203) and can determine if the geomagnetic value is in a portrait mode range (S205). If the geomagnetic value is in the portrait mode range, the control unit 160 can determine that the portable electronic device 100 is postured in a portrait mode orientation (S207); otherwise, the control unit 160 determines that the portable electronic device 100 is postured in a landscape mode orientation (S209). Consequently, the control unit 160 can configure the portable electronic device 100 in the portrait mode or the landscape mode according to the current orientation of the portable electronic device.

Figure 6:
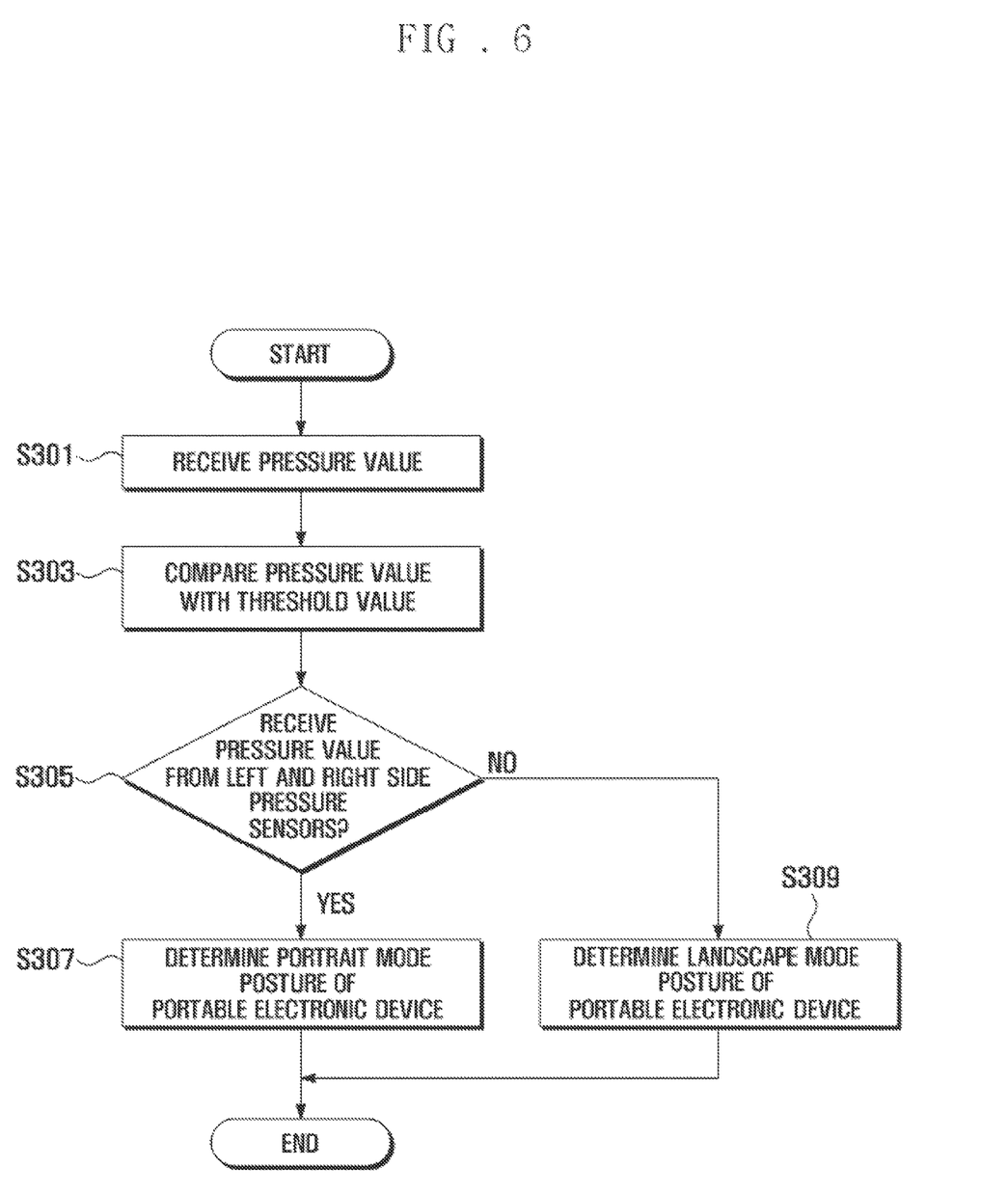
FIG. 6 is a flowchart illustrating a mode determination procedure of the display mode switching method of FIG. 4 according to embodiments of the present invention.

FIG. 6 is a flowchart illustrating a mode determination procedure for the display mode switching method of FIG. 4 according to other exemplary embodiments of the present invention.

FIG. 6 is related to exemplary embodiments in which the mode condition detector 140 of the portable electronic device 100 can be implemented with at least one pressure sensor. The control unit 160 can receive pressure values sensed by pressure sensors arranged along the sides of the portable electronic device 100 (S301). When the mode condition detector 140 is implemented with the pressure sensors arranged around the sides of the portable electronic device 100, the pressure sensors can sense different pressures according to the grasp of the portable electronic device 100. Accordingly, the control unit 160 can determine the posture of the portable electronic device 100 based on an analysis of the pressure values received from the pressure sensors. Upon receipt of the pressure values, the control unit 160 can compare the pressure values with a threshold value (S303). The threshold value can be a predetermined pressure value to be compared with the pressure values sensed by the pressure sensors deployed in one or more suitable locations around the portable electronic device 100. If, for example, the portable electronic device is grasped around the left and right sides, the pressure values sensed by the pressure sensors arranges on the left and right side can be higher than those of other pressure sensors. Accordingly, the control unit 160 can determine whether the portable electronic device is in a portrait mode posture or a landscape mode posture. The control unit 160 can also determine whether the pressure values are received from the left and right side sensors or the top and bottom side sensors (S305). Assuming that the long sides of the portable electronic device 100 are the left and right sides and the short sides of the portable electronic device 100 are the top and bottom sides, if the pressure values are received from the left and right side sensors, the control unit 160 can determine that the portable electronic device 100 is in the portrait mode posture (S307). Otherwise, if the pressure values are received from the top and bottom side sensors, the control unit 160 can determine that the portable electronic device 100 is in the landscape mode posture (S309). Consequently, the control unit 160 configures the portable electronic device 100 in the portrait mode or the landscape mode according to the current posture of the portable electronic device.

Figure 7:
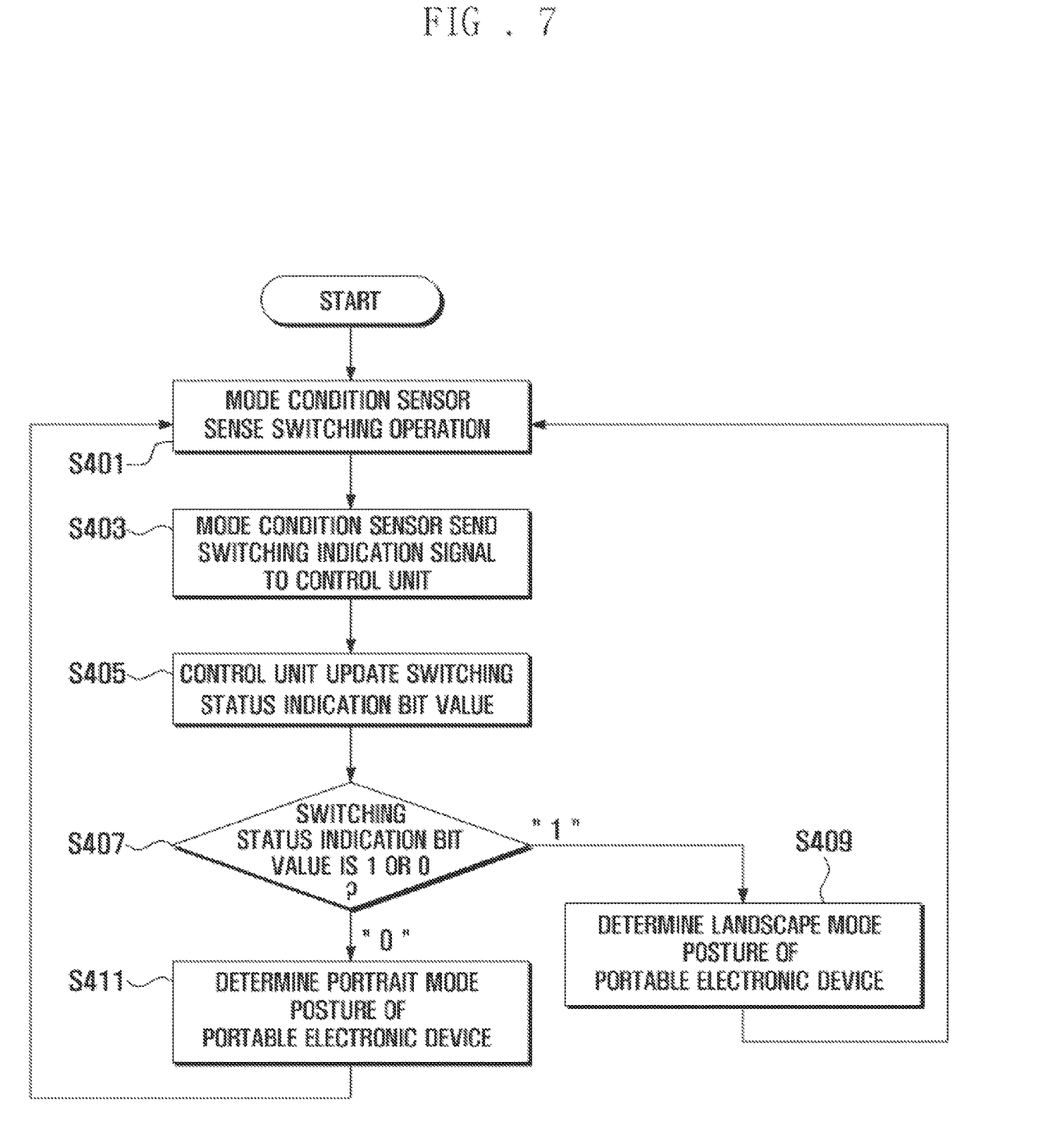
FIG. 7 is a flowchart illustrating a mode determination procedure of the display mode switching method of FIG. 4 according to embodiments of the present invention.

FIG. 7 is a flowchart illustrating a mode determination procedure for the display mode switching method of FIG. 4 according to exemplary embodiments of the present invention.

FIG. 7 is related to embodiments in which portable electronic device 100 can have a first body and a second body connected to the first body and in which the mode condition detector 140 of portable electronic device 100 can be implemented as a switch or a sensor. The mode condition detector 140 can detect a switching operation between the first and second bodies of the portable electronic device (S401) and can output a switching indication signal to the control unit 160 (S403). Upon receipt of the switching signal, the control unit 160 can update a bit value indicating the switching status for monitoring the switching operation between the first and second bodies (S405). The control unit 160 can determine, for example, sequentially if the switching status indication bit is set to 1 or 0 (S407). If the switching status indication bit is set to 1, the control unit 160 can determine that the portable electronic device 100 is in a landscape mode posture (S409). If the switching status indication bit is set to 0, the control unit 160 can determine that the portable electronic device 100 is in a portrait mode posture (S411). The switching status indication bit can be updated to 1 or 0 alternatively whenever the switching operation between the first and second bodies occurs. After updating the switching status indication bit at steps S409 and S411, the process returns to step S401.

As described herein, the display mode switching method according to embodiments of the present invention enables facilitating composition of a text message by switching the display mode of an integrated display and input device between a portrait mode and a landscape mode according to the posture or orientation of the portable electronic device.

Although pressure sensors can be installed along all the sides of the portable electronic device in an exemplary embodiment of the present invention, the present invention is not limited thereto. For example, the pressure sensor can be installed along at least one of the left and right sides of the portable electronic device in the landscape mode posture. In such cases, the posture of the portable electronic device can be determined by comparing the pressure value detected by the at least one pressure sensor with a threshold value.

The foregoing is illustrative of embodiments of the invention and is not to be construed as limiting thereof. Although a few exemplary embodiments of the invention have been described, those skilled in the art will readily appreciate that many modifications are possible in the exemplary embodiments without materially departing from the scope or spirit of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A display method of an electronic device, the method comprising:
    detecting an orientation of the electronic device;
    displaying, on a single display screen of the electronic device during a text input mode,
        an input region configured to display a plurality of virtual keys according to one of a first key map corresponding to a first orientation of the electronic device and a second key map corresponding to a second orientation of the electronic device, in response to the detected orientation of the electronic device, and
        an output region configured to display characters input via the virtual keys;
    changing, in response to the orientation of the electronic device switching from the first orientation to the second orientation, an arrangement of the plurality of virtual keys according to the second key map including a left-side group of virtual keys and a right-side group of virtual keys that are respectively arranged at left and right sides of the single display screen; and
    changing, in response to the orientation of the electronic device switching from the second orientation to the first orientation, the arrangement of the plurality of virtual keys according to the first key map,
    wherein the first orientation of the electronic device corresponds to a portrait orientation, and the second orientation of the electronic device corresponds to a landscape orientation,
    wherein the first key map is a 3×4 key map having more than one virtual key that each corresponds to a plurality of inputtable characters other than numbers, and
    wherein the second key map is at least one of a 5×4 key map or a qwerty key map.

2. The method of claim 1, wherein a key size of each key included in the first key map is larger than a key size of each corresponding key included in the second key map.

3. The method of claim 1, wherein each virtual key of the plurality of virtual keys includes at least one character.

4. The method of claim 3, wherein a font size of the at least one character included in each virtual key of the plurality of virtual keys is different depending on the detected orientation of the electronic device.

5. The method of claim 1, further comprising:
adjusting a number of characters per line displayed in the output region according to the detected orientation of the electronic device.

6. The method of claim 1, wherein the output region is displayed across an entire first width of the single display screen when the detected orientation of the electronic device is the first orientation, and the output region is displayed across an entire second width of the single display screen when the detected orientation of the electronic device is the second orientation.

7. An electronic device, comprising:
a display;
an orientation detector configured to detect an orientation of the electronic device; and
a processor configured to:
control the display to display, on a single display screen during a text input mode,
an input region configured to display a plurality of virtual keys according to one of a first key map corresponding to a first orientation of the electronic device and a second key map corresponding to a second orientation of the electronic device, in response to a detected orientation of the electronic device, and
an output region configured to display characters input via the virtual keys,
change, in response to the orientation of the electronic device switching from the first orientation to the second orientation, an arrangement of the plurality of virtual keys according to the second key map including a left-side group of virtual keys and a right-side group of virtual keys that are respectively arranged at left and right sides of the single display screen, and
change, in response to the orientation of the electronic device switching from the second orientation to the first orientation, the arrangement of the plurality of virtual keys according to the first key map,
wherein the first orientation of the electronic device corresponds to a portrait orientation, and the second orientation of the electronic device corresponds to a landscape orientation,
wherein the first key map is a 3×4 key map having more than one virtual key that each corresponds to a plurality of inputtable characters other than numbers, and
wherein the second key map is at least one of a 5×4 key map or a qwerty key map.

8. The electronic device of claim 7, wherein a key size of each key included in the first key map is larger than a key size of each corresponding key included in the second key map.

9. The electronic device of claim 7, wherein each virtual key of the plurality of virtual keys includes at least one character.

10. The electronic device of claim 9, wherein a font size of the at least one character included in each virtual key of the plurality of virtual keys is different depending on the detected orientation of the electronic device.

11. The electronic device of claim 7, wherein the processor is further configured to control the display to adjust a number of characters per line displayed in the output region according to the detected orientation of the electronic device.

12. The electronic device of claim 7, wherein the output region is displayed across an entire first width of the single display screen when the detected orientation of the electronic device is the first orientation, and the output region is displayed across an entire second width of the single display screen when the detected orientation of the electronic device is the second orientation.

* * * * *